US012697583B2

(12) United States Patent
Koers

(10) Patent No.: US 12,697,583 B2
(45) Date of Patent: Aug. 4, 2026

(54) METHOD AND DEVICE FOR REMOVING AMMONIA FROM EXHAUST AIR FROM A LIVESTOCK STABLE

(71) Applicant: Bonno Koers, Doesburg (NL)

(72) Inventor: Bonno Koers, Doesburg (NL)

( * ) Notice: Subject to any disclaimer, the term of this patent is extended or adjusted under 35 U.S.C. 154(b) by 858 days.

(21) Appl. No.: 17/111,150

(22) Filed: Dec. 3, 2020

(65) Prior Publication Data

US 2021/0162343 A1      Jun. 3, 2021

(30) Foreign Application Priority Data

Dec. 3, 2019      (NL) ..................................... 2024365

(51) Int. Cl.
| | |
|---|---|
| *B01D 53/14* | (2006.01) |
| *B01D 53/58* | (2006.01) |
| *B01D 53/73* | (2006.01) |
| *B01D 53/85* | (2006.01) |
| *C02F 3/30* | (2023.01) |

(52) U.S. Cl.
CPC ......... B01D 53/85 (2013.01); B01D 53/1425 (2013.01); B01D 53/1493 (2013.01); B01D 53/58 (2013.01); B01D 53/73 (2013.01); C02F 3/305 (2013.01); B01D 2251/95 (2013.01); B01D 2252/103 (2013.01); B01D 2257/406 (2013.01); B01D 2258/0266 (2013.01)

(58) Field of Classification Search
CPC ............... B01D 53/85; B01D 53/1425; B01D 53/1493; B01D 53/58; B01D 53/73; B01D 2251/95; B01D 2252/103; B01D 2257/406; B01D 2258/0266; B01D 53/14; B01D 53/78; B01D 53/84; C02F 3/305; C02F 3/302; C02F 2101/16; C02F 2103/18; C02F 2103/20; C02F 2209/06; Y02A 50/20

See application file for complete search history.

(56) References Cited

U.S. PATENT DOCUMENTS

| | | | | |
|---|---|---|---|---|
| 4,151,265 A | * | 4/1979 | Ethington | .............. B01D 53/56 |
| | | | | 423/396 |
| 6,013,512 A | | 1/2000 | Turschmid et al. | .......... 435/266 |
| 6,291,233 B1 | * | 9/2001 | Saha | ...................... B01D 53/85 |
| | | | | 210/601 |
| 7,157,271 B2 | * | 1/2007 | Ryu | ....................... B01D 53/84 |
| | | | | 435/299.1 |

FOREIGN PATENT DOCUMENTS

| | | | | |
|---|---|---|---|---|
| BE | 1012344 | 10/2000 | | |
| DE | 20 2011 000 946 | 9/2011 | ............ | B01D 53/58 |
| EP | 486748 A1 | * 5/1992 | .......... | A01K 63/045 |
| EP | 2 942 098 | 11/2015 | ............ | B01D 53/58 |
| JP | 2005-161258 | 6/2005 | ............ | B01D 53/58 |
| WO | WO 2019/009699 | 1/2019 | | |

* cited by examiner

*Primary Examiner* — Liban M Hassan
(74) *Attorney, Agent, or Firm* — HAYES SOLOWAY P.C.

(57) ABSTRACT

Disclosed is a method for complete or near complete removing ammonia from exhaust air from a livestock stable. Moreover, the method allows for full nitrification to nitrate, thus obviating the problem of toxic nitrite in the waste water after scrubbing the exhaust air.

16 Claims, 1 Drawing Sheet

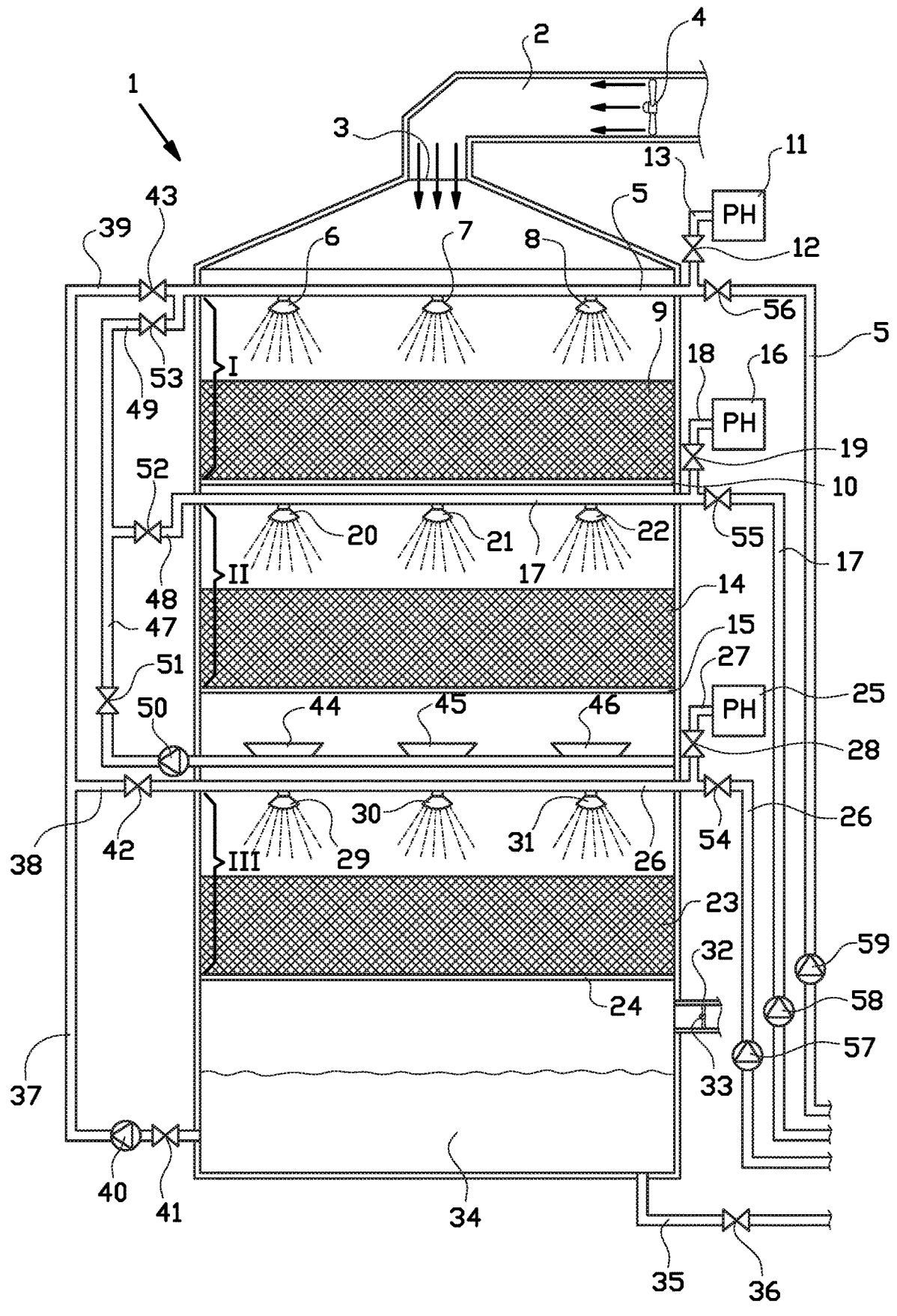

METHOD AND DEVICE FOR REMOVING AMMONIA FROM EXHAUST AIR FROM A LIVESTOCK STABLE

The present invention relates to a method for removing ammonia from exhaust air from a livestock stable and a device for removing ammonia from exhaust air from a livestock stable.

Exhaust air from a livestock stable contains ammonia. Ammonia emission is highly undesirable and harmful for the environment. For these reasons, and also because of the bad odor of ammonia, it is desirable to cut ammonia emissions.

One way to achieve this, is by using so called air scrubbers. Air scrubbers have been developed for ammonia (NH$_3$) removal of pig and poultry houses over the last 20 years to prevent ammonia emission and eutrophication of soils. In view of growing suburbanization, odor removal has become also important. It is therefore of importance that ammonia is removed from exhaust air as much as possible.

Ammonia removal from exhaust gases may involve conversion of ammonia using bacteria, so-called biological scrubbing. In order to become available for bacterial metabolization, ammonia (NH$_3$) has to dissolve first into water as shown below in reaction (A):

$$NH_3(g) \rightarrow NH_3(aq) \qquad (A)$$

Under acid conditions aqueous ammonia is then converted to ammonium cations (NH$_4^+$) in accordance with reaction (B):

$$NH_3 + H_2O \leftrightarrow NH_4^+ + OH^- \qquad (B)$$

Bacteria may then metabolize the ammonium. This biological conversion is based on nitrification. In this process bacteria oxidize ammonium in a first step to nitrite (NO$_2$) in accordance with reaction (C):

$$NH_4^+ + 1.5O_2 \rightarrow NO_2^- + H_2O + 2H^+ \qquad (C)$$

This step is mainly carried out by *Nitrosomas* bacteria. After this conversion, the nitrite can be further oxidized to nitrate (NO$_3^-$) in accordance with reaction (D):

$$NO_2 + \frac{1}{2}O_2 \rightarrow NO_3^- \qquad (D)$$

This step is mainly carried out by *Nitrobacter* bacteria. This step often occurs incompletely, because bacteria require specific conditions. For instance, the *Nitrobacter* bacterium prefers conditions close to neutral pH in order to carry out reaction (D), whilst on the other hand reaction (C) acidifies the medium. This leads to incomplete nitrification and accumulation of toxic nitrite in the waste water resulting from scrubbing the exhaust air.

Currently used air scrubbers are able to achieve a reduction of ammonia in air of between 50 and 70% and result in waste water containing nitrite in concentrations that are undesirable.

WO 2019/009699 A2 discloses a method for the production of organic fertilizer based on ammonium and/or nitrate.

DE 20 2011 000946 U1 discloses an exhaust air purification system, in particular for a livestock barn, and a livestock barn with such an exhaust air purification system.

JP 2005 161258 A discloses a nitrite-formation method and device for high concentration ammonia-containing gas.

EP 2 942 098 A1 discloses a method for removing nitrite from a liquid, such as coming from washing of air which comes from livestock farming.

U.S. Pat. No. 6,013,512 A discloses a process and apparatus for the removal of gaseous pollutants from a waste gas stream.

BE 1 012 344 A3 discloses a product for the removal of ammonia under various conditions, for biological conversion of ammonia to nitrite and nitrate, using a microbial community.

The inventor considers that there is room for improvement in removing ammonia from exhaust air from livestock stables.

The invention aims in particular at increasing the amount of ammonia removed from said exhaust gas and reducing the amount of toxic nitrite in the waste water produced during the air scrubbing process.

SUMMARY OF THE INVENTION

The present invention relates in a first aspect to a method for removing ammonia from exhaust air from a livestock stable, comprising passing said exhaust air and an aqueous liquid in a co-current manner through a device having multiple zones, which method comprises: i) passing said air and said aqueous liquid trough a first zone of said device in which ammonia contained in said air is dissolved in the aqueous liquid under conditions that allow conversion of ammonia to ammonium in said aqueous liquid; ii) passing said air and aqueous liquid containing dissolved ammonium from said first zone to a second zone of said device, wherein the second zone contains microorganisms capable to convert ammonium into nitrite under conditions that allow said microorganisms to convert ammonium to nitrite in said aqueous liquid; iii) passing said air and aqueous liquid containing dissolved nitrite from said second zone to a third zone of said device, in which third zone nitrite is converted to nitrate in said aqueous liquid, iv) passing from said third zone purified air and said aqueous liquid containing dissolved nitrate; wherein in said third zone the pH is maintained below 2.

In a second aspect the invention relates to a device for removing ammonia from exhaust air from a livestock stable, comprising an air inlet in a top portion of the device configured to introduce said exhaust air into said device and an aqueous liquid inlet in a top portion of the device configured to introduce aqueous liquid into said device; a first zone downstream of said air inlet and said aqueous liquid inlet, wherein said first zone is configured to enable dissolving of ammonia contained in said air in the aqueous liquid under conditions that allow conversion of ammonia to ammonium in said aqueous liquid; a second zone downstream of said first zone, configured to receive aqueous liquid and air from said first zone and containing microorganisms capable to convert ammonium into nitrite under conditions that allow said microorganisms to convert ammonium to nitrite in said aqueous liquid; a third zone downstream of said second zone and configured to receive air and aqueous liquid containing dissolved nitrite from said second zone, wherein said third zone is configured to allow conversion of nitrite to nitrate at a pH below 2; an air outlet configured to pass air from said third zone out of said device, and an aqueous liquid outlet configured to pass aqueous liquid from said third zone out of said device, wherein said air outlet and said aqueous liquid outlet are arranged in a bottom portion of said device.

The method and the device of the invention allow to achieve a complete or near complete removal of ammonia from exhaust air. Moreover, the method and device of the invention allow full nitrification to nitrate, thus obviating the problem of toxic nitrite in the waste water after scrubbing the exhaust air. The invention requires less water than conventional scrubbers in order to achieve comparable and even improved results. The present invention allows to combine the abovementioned reactions (A) to (D) in one combined biotrickling filter. As such, the invention requires only one passage of air through a scrubber device and therefore can be carried out in a cost effective and time efficient manner.

SHORT DESCRIPTION OF THE DRAWINGS

FIG. 1 shows a schematic representation of an embodiment of the device according to the invention

DETAILED DESCRIPTION OF THE INVENTION

According to the invention passing air to be purified from ammonia and an aqueous liquid are passed in a cocurrent manner through a device, in particular a scrubber device, having multiple zones. The air and aqueous liquid flow in a co-current manner, they flow in the same direction. In general the air and aqueous liquid will flow downwards from top to bottom of the device. This is advantageous for controlling the conditions in the zones of the device.

The aqueous liquid serves as washing medium wherein ammonia from the exhaust air can be dissolved and degraded eventually to nitrate. The aqueous liquid may suitably be water.

After entry into the device the air and aqueous liquid are passed into a first zone. In this first zone gaseous ammonia contained in said air to be purified is dissolved in the co-currently flowing aqueous liquid under conditions that allow conversion of dissolved ammonia to ammonium in said aqueous liquid. This process can be represented by the following reactions (A) and (B):

$$NH_3(g) \rightarrow NH_3(aq) \tag{A}$$

$$NH_3 + H_2O \leftrightarrow NH_4^+ + OH^- \tag{B}$$

Dissolved ammonia forms an equilibrium with ammonium. When dissolving ammonia into neutral or acid medium, such as water, the equilibrium will be strongly in favor of ammonium. For instance at a pH of 7, less than 1% of the total of ammonia/ammonium will be present as ammonia. In order to carry out downstream nitrification out as efficient as possible it is highly preferred that all ammonia is converted to ammonium. This will occur under acidic conditions. It is therefore preferred to maintain the pH in the first zone slightly acidic. It is therefore preferred that in the first zone the pH is maintained between 3,5 and 6,5, preferably between 4 and 5. Reaction (B) will result in an increase of the pH. It may therefore be necessary to actively regulate the pH to the abovementioned acid ranges. For this purpose the device of the invention may be provided with pH regulation means configured to add acid or base to the aqueous liquid introduced into the first zone of the device.

The aqueous liquid may be introduced from the top portion of the device via a water inlet conduit and sprinklers. Regulation of the pH of the water introduced into the first zone I may inter alia be effected by arranging pH control means along the water inlet conduit. Such pH control means may be configured to add base or acid into the inlet conduit in order to maintain the pH of the water introduced into the first zone I at a desired level.

It is preferred that the first zone comprises a filter medium comprising channels through which aqueous liquid is allowed to trickle downwards through the first zone. The use of such filter media allows optimal surface contact between water and air, and thus promotes dissolving of ammonia from the air into the aqueous liquid.

Next, the air and aqueous liquid containing dissolved ammonium are passed from said first zone to a second zone of said scrubber. The second zone contains microorganisms capable to convert ammonium into nitrite under conditions that allow said microorganisms to convert ammonium to nitrite in said aqueous liquid in accordance with reaction (C):

$$NH_4^+ + 1.5O_2 \rightarrow NO_2^- + H_2O + 2H^+ \tag{C}$$

The second zone preferably also comprises a filter medium, comprising multiple channels through which the liquid and air may trickle downwards. This filter medium allow microorganisms to inhabit the surfaces of the channels and allows for optimal surface contact of the aqueous liquid trickling down the second zone with the microorganisms. Here, a biochemical process takes place. This biochemical reaction may in particular involve the action of *Nitrosomas* bacteria. These bacteria exert their action normally between a pH of 2 to 8, preferably between 3 to 8. It is therefore preferred that in the second zone the pH is maintained between 2 and 8, preferably between 3 and 8.

Regulation of the pH of the aqueous liquid introduced into the second zone may inter alia be effected by arranging pH control means along a water inlet conduit. Such pH control means are configured to add base or acid into the inlet conduit in order to maintain the pH of the water introduced into the second zone at the abovementioned ranges. It is also possible to supply additional aqueous liquid between the first and second zone second zone, for adjustment of the pH, if necessary. For this purpose the device may comprise means configured to supply additional aqueous liquid, and arranged between the first and second zone. Water and acid/base may for instance be introduced into the second zone via sprinklers.

The second zone may also house microorganisms capable of converting nitrite in the water to nitrate in accordance with reaction (D):

$$NO_2^- + \frac{1}{2}O_2 \rightarrow NO_3^- \tag{D}$$

These microorganisms include *Nitrobacter* bacteria. These bacteria prefer a near neutral pH to optimally exert their action. As reaction (C) results in the production of nitrous acid the aqueous liquid will acidify as it descends though the second zone. As a result reaction (D) will not take place optimally as the water trickles through the second zone, leaving poisonous nitrite in the water after the water has passed the second zone.

The inventor has solved this problem by providing a third zone in which a highly acidic environment is created with a pH below 2. The inventor has surprisingly found that at this low pH nitrite is converted to nitrate effectively in a chemical manner (physical chemical process).

The co-currently flowing air provides the oxygen required for this reaction. The high acidity in third zone allows complete or near complete conversion of nitrite into the relatively harmless nitrate.

In addition, also due to the very low pH any residual ammonia in the air descending through the third zone will dissolve in the water, so that the air flowing out of the third zone is highly purified from ammonia.

Excellent results have been obtained at a pH below 1. It is therefore preferred that the pH in the third zone is maintained at 1 or lower, preferably between 0.5 and 1, such as approximately 0.7.

Regulation of the pH of the aqueous liquid introduced into the third zone may inter alia be effected by arranging pH control means along a water inlet conduit. Such pH control means are configured to add acid into the inlet conduit in order to maintain the pH of the water introduced into the third zone at the abovementioned acidic ranges. Additional aqueous liquid may supplied between the second and third zone, for further regulation of the pH in the third zone, if necessary. For this purpose the device may comprise means configured to supply additional aqueous liquid, and arranged between the second and third zone. Acid and water may for instance be introduced into the third zone via sprinklers.

It is preferred that also the third zone comprises a filter medium comprising channels through which aqueous liquid is allowed to trickle downwards through the third zone. The use of such filter media allows sufficient reaction time and allows quick and uniform adjustment of the pH of the aqueous liquid in order the maintain the pH at the above-mentioned highly acidic pH ranges.

As mentioned above, reaction D (conversion of nitrite to nitrate) may also take place to a certain extent in a bio-chemical manner in the second zone, although the efficiency of this biochemical reaction (D) in the second zone is not of critical importance as the highly acidic environment in the third zone allows full conversion of nitrite into nitrate.

It is also possible that part of the conversion of nitrite into nitrate in the third zone takes place biochemically, although this may have only a minor role to the physical chemical process taking place due to the highly acidic conditions in the third zone. In principle the reaction in the third zone may exclusively take place in a physical chemical manner.

After the air and aqueous liquid has passed the third zone, the air is clean from ammonia and the aqueous liquid contains the relatively harmless nitrate. The clean air and nitrate containing aqueous liquid can now be discharged from said third zone. This can be done via an air outlet configured to pass air from said third zone out of said device, and an aqueous liquid outlet configured to pass aqueous liquid from said third zone out of said device, wherein said air outlet and said aqueous liquid outlet are arranged in a bottom portion of said device.

The aqueous liquid discharged from the device may be subjected to denitrification in order to convert the nitrate into nitrogen. In the method of the invention it is therefore possible that said aqueous washing liquid containing dis-solved nitrate is subjected to denitrification. For this pur-pose, the device may comprise denitrification means arranged downstream of said third zone. Such denitrification means may for instance include a denitrification tank. In such a tank, a carbon source (e.g. sugar) is added to allow bacteria to convert nitrate into nitrogen under anaerobic conditions.

In a preferred embodiment the aqueous liquid used in the method of the invention is recycled to a certain extent. This saves water and may contribute to pH maintenance. Fur-thermore, it reduces the amount of nitrate containing water that has to be discharged from the device. For instance, aqueous liquid from the second zone may be recycled to the first zone. In this respect the device according to the inven-tion may be equipped with recycling means downstream of said second zone and configured to recycle aqueous liquid from the second zone to the first zone.

In addition or alternatively, aqueous liquid from the third zone may be recycled to the first and/or second zone. In this respect the device according to the invention may comprise recycling means downstream of said third zone and config-ured to recycle aqueous liquid from the third zone to the first and/or second zone. Such a recycling may in particular be preferable for aqueous liquid from the third zone to the first zone in order to contribute to the preferred acidic conditions in the first zone.

Filter media that can be used are preferably filter media prepared from plastics (e.g. from polyethylene and/or poly-propylene), such as an open pore synthetic foam (e.g. polyurethane foam or cylinders of filter material of rolled up plastic mats comprising channels. Particularly suitable filter media for purposes of this invention have been described in previous patent applications EP3395429A1 and NL1007019C1 of the present inventor.

DETAILED DESCRIPTION OF THE DRAWING

The invention will now be further elucidated in the attached drawing. The following explanation is meant to illustrate and explain the invention and not to limit the claims. The dimensions in the figures are not necessarily proportional to the actual dimensions.

FIG. 1 shows an exemplary device 1 in a accordance with the invention.

Air to be purified from ammonia is passed from a stable (not shown) via air supply conduit 2 and air inlet 3 with help of vent 4 in the direction of the arrows.

An aqueous washing liquid, in this example water, is introduced from the top portion of the device 1 via water inlet conduit 5 and sprinklers 6, 7, 8 and allowed to trickle into a first zone I of the device 1 co-currently with the air introduced via air inlet 3. The first zone I comprises a first filter medium 9 comprising multiple channels through which the water and air may flow downwards and which is placed on a support grid 10. In order to dissolve ammonia contained in the air to be purified in the water the pH should be kept acidic, preferably between 3,5 and 6,5, such as between 4 and 5. Regulation of the pH of the water introduced into the first zone I may inter alia be effected by arranging pH control means 11 along the water inlet conduit 5. Such pH control means are configured to add base or acid into the inlet conduit in order to maintain the pH of the water introduced into the first zone I at a desired level, via pH line 13 and pH valve 12. The use of filter material 9 allows optimal surface contact between water and air, which promotes dissolving of ammonia into the water in accordance with reaction (A):

$$NH_3(g) \rightarrow NH_3(aq) \tag{A}$$

As the water trickles down via the filter material 9 in the first zone I, the acid environment allows conversion of ammonia to ammonium cations in accordance with reaction (B):

$$NH_3 + H_2O \leftrightarrow NH_4^+ + OH^- \tag{B}$$

Normally dissolved ammonia forms an equilibrium with ammonium. However, by maintaining the pH acidic the equilibrium will shift to the ammonium side and in principle all ammonia will be converted into ammonium cations.

After passing the first zone I, the water will therefore in principle contain dissolved ammonium and only small amounts of ammonium (if any). The air after passing the first zone will already be substantially purified and contain only small amounts of gaseous ammonia, if any.

After passing the first zone I the water and air is now passed into the second zone II. The second zone II comprises a second filter medium 14 comprising multiple channels through which the liquid and air may flow downwards and placed on a support grid 15. Filter medium 14 houses microorganisms capable of converting ammonium in the water to nitrite in accordance with reaction (C):

$$NH_4^+ + 1.5O_2 \rightarrow NO_2^- + H_2O + 2H^+ \qquad (C)$$

This biological reaction involves the action of *Nitrosomas* bacteria. These bacteria exert their action between a pH of 2 to 8, preferably between 3 to 8. Regulation of the pH of the water introduced into the second zone II may inter alia be effected by arranging pH control means 16 along water inlet conduit 17. Such pH control means are configured to add base or acid into the inlet conduit in order to maintain the pH of the water introduced into the second zone II at a desired level, via pH line 18 and pH valve 19. The pH may be adjusted via sprinklers 20, 21, 22 via which also additional water may be provided to second zone II together with acid or base. Filter medium 14 may also house microorganisms capable of converting nitrite in the water to nitrate in accordance with reaction (D):

$$NO_2^- + \frac{1}{2}O_2 \rightarrow NO_3^- \qquad (D)$$

These include *Nitrobacter* bacteria. These bacteria prefer a near neutral pH to optimally exert their action. As reaction (C) will acidify the water this reaction will therefore not take place optimally as the water descends the second zone II, leaving poisonous nitrite in the water after the water has passed the second zone II.

After passing the second zone II the water and air is now passed into the third zone III. The second zone III comprises a third filter medium 23 comprising multiple channels through which the liquid and air may flow downwards and which is placed on a support grid 24. The inventor has found that reaction (D) takes place chemically if the pH is very low. Therefore, in the third zone III the pH is most preferably maintained between 0.5 and 1, such as 0.7.

Regulation of the pH of the water introduced into the third zone III may inter alia be effected by arranging pH control means 25 along water inlet conduit 26. Such pH control means are configured to add acid into the inlet conduit in order to maintain the pH of the water introduced into the third zone III at a desired level, via pH line 27 and pH valve 28. The pH may be adjusted via sprinklers 29, 30, 31 via which also additional water may be provided to third zone III together with acid. The high acidity in third zone III allows complete or near complete conversion of nitrite into the relatively harmless nitrate. In addition, also due to the very low pH any residual ammonia in the air in third zone III will dissolve in the water, so that the air flowing out of the third zone III is highly purified and can be discharged via air outlet 32 using vent 33.

The water flowing out of the third zone III may be collected in reservoir 34 and can be discharged from the reservoir via water outlet 35 using valve 36. Part of the acid water in reservoir 34 may optionally be recirculated to the first or third zone I, III via recirculation lines 37, 38, 39 using pump 40 and valves 41, 42, 43. This saves water and acid required for regulating the pH with pH control means 11 and/or 25.

Optionally part of the water flowing out of the second zone II may be collected in water collectors 44, 45, 46 and be recycled to the top portion of second zone II or to zone I via recirculation lines 47, 48, 49 using pump 50 and valves 51, 52, 53. This saves water and base or acid required for regulating the pH with pH control means 11 and/or 16.

Water inlet conduits 26, 17, 5 may suitably be provided with valves 54, 55, 56 and pumps 57, 58, 59 in order to regulate water supply to zones I, II and III.

The invention claimed is:

1. A method for removing ammonia from exhaust air from a livestock stable, comprising passing said exhaust air and an aqueous liquid in a co-current manner through a device having multiple zones, which method comprises:

i) passing said air and said aqueous liquid through a first zone of said device in which ammonia contained in said air is dissolved in the aqueous liquid while maintaining the pH in said first zone between 3.5 and 6.5 to allow conversion of ammonia to ammonium in said aqueous liquid;

ii) passing said air and aqueous liquid containing dissolved ammonium from said first zone to a second zone of said device, wherein the second zone contains microorganisms capable to convert ammonium into nitrite, while maintaining the pH in said second zone between 2 and 8 to allow said microorganisms to convert ammonium to nitrite in said aqueous liquid;

iii) passing said air and aqueous liquid containing dissolved nitrite from said second zone to a third zone of said device, in which the third zone the pH is maintained below 2 to convert nitrite to nitrate in said aqueous liquid, iv) discharging said air and aqueous liquid containing dissolved nitrate from said third zone.

2. The method according to claim 1, wherein in the first zone the pH is maintained between 4 and 5.

3. The method according to claim 1, wherein in the second zone the pH is maintained between 3 and 8.

4. The method according to claim 1, wherein in the third zone the pH is maintained at 1 or lower.

5. The method according to claim 1, wherein the aqueous liquid from the second zone is recycled to the first zone.

6. The method according to claim 1, wherein the aqueous liquid from the third zone is recycled to the first and/or second zone.

7. The method according to claim 1, wherein additional aqueous liquid is supplied between the first and second zone and/or between the second and third zone.

8. The method according to claim 1, wherein following step iv) said aqueous liquid containing dissolved nitrate is subjected to denitrification.

9. The method according to claim 2, wherein in the second zone the pH is maintained between 3 and 8.

10. The method according to claim 2, wherein in the third zone the pH is maintained at 1 or lower.

11. The method according to claim 2, wherein the aqueous liquid from the second zone is recycled to the first zone.

12. The method according to claim 2, wherein the aqueous liquid from the third zone is recycled to the first and/or second zone.

13. The method according to claim 2, wherein additional aqueous liquid is supplied between the first and second zone and/or between the second and third zone.

14. The method according to claim 2, wherein following step iv) said aqueous liquid containing dissolved nitrate is subjected to denitrification.

15. The method according to claim 1, wherein in the third zone the pH is maintained between 0.5 and 1.

16. The method according to claim 2, wherein in the third zone the pH is maintained between 0.5 and 1.

\* \* \* \* \*